(12) United States Patent
Hsu

(10) Patent No.: US 11,656,120 B2
(45) Date of Patent: May 23, 2023

(54) STRUCTURE OF OPTICAL SENSOR

(71) Applicant: SENSORTEK TECHNOLOGY CORP., Jhubei (TW)

(72) Inventor: Feng-Jung Hsu, Jhubei (TW)

(73) Assignee: Sensortek Technology Corp., Jhubei (TW)

(*) Notice: Subject to any disclaimer, the term of this patent is extended or adjusted under 35 U.S.C. 154(b) by 0 days.

(21) Appl. No.: 17/405,254

(22) Filed: Aug. 18, 2021

(65) Prior Publication Data

US 2022/0057259 A1 Feb. 24, 2022

Related U.S. Application Data

(60) Provisional application No. 63/067,880, filed on Aug. 20, 2020.

(51) Int. Cl.
*G01J 1/42* (2006.01)

(52) U.S. Cl.
CPC ...................... *G01J 1/42* (2013.01)

(58) Field of Classification Search
CPC .... G01J 1/06; G01J 1/04; G01J 1/0407; G01J 1/0492; G01J 1/0488; G01J 1/0459; G01J 1/0455; G01J 1/0437; G01J 1/0429; G01J 1/0411; G01J 1/0214; G01J 1/02; G01J 1/0204; G01J 1/0209; G01J 1/42
See application file for complete search history.

(56) References Cited

U.S. PATENT DOCUMENTS

| 5,776,643 | A | * | 7/1998 | Hirai | G03C 7/12 430/641 |
| 8,487,914 | B2 | | 7/2013 | Trott | |
| 9,029,759 | B2 | * | 5/2015 | Singh | H01L 27/14685 250/239 |
| 9,231,012 | B2 | * | 1/2016 | Weng | H01L 24/06 |
| 9,305,951 | B2 | * | 4/2016 | Kang | H01L 27/14689 |
| 9,934,419 | B2 | * | 4/2018 | Dong | G06V 40/1329 |
| 10,043,847 | B2 | * | 8/2018 | You | G06V 40/1388 |

(Continued)

FOREIGN PATENT DOCUMENTS

TW  201735329 A  10/2017

OTHER PUBLICATIONS

Taiwan Patent Office Official Action dated Dec. 6, 2022 for corresponding TW Application No. 110130415.

(Continued)

*Primary Examiner* — John R Lee
(74) *Attorney, Agent, or Firm* — Rosenberg, Klein & Lee

(57) ABSTRACT

This application provides a structure of the optical sensor, in which a photosensitive element is arranged on a substrate, a colloid layer is arranged on the upper part of the substrate and covers the photosensitive element, and a thin film is further arranged. The device includes an adhesive layer and a light-transmitting layer, the adhesive layer is disposed above one of the colloid layers, the light-transmitting layer is disposed above one of the adhesive layers, and the structure can be used to provide the film member that can be changed according to requirements The optical design reduces the production cost of the optical sensor; this application further provides a shielding layer between the film member and the colloid layer to improve the photosensitive efficiency of the optical sensor.

9 Claims, 9 Drawing Sheets

(56) References Cited

U.S. PATENT DOCUMENTS

| | | | |
|---|---|---|---|
| 10,043,924 B1* | 8/2018 | Kaufmann | H01L 31/02327 |
| 10,713,521 B2* | 7/2020 | You | G06V 40/1329 |
| 2011/0156192 A1* | 6/2011 | Higuchi | H01L 27/14632 |
| | | | 257/434 |
| 2013/0127001 A1* | 5/2013 | Wen | H01L 27/14618 |
| | | | 257/432 |
| 2015/0295002 A1* | 10/2015 | Kang | H01L 27/14636 |
| | | | 438/70 |
| 2016/0079304 A1* | 3/2016 | Weng | H01L 24/81 |
| | | | 438/65 |
| 2017/0162620 A1* | 6/2017 | Wang | G06V 40/1359 |
| 2017/0243049 A1* | 8/2017 | Dong | G06V 40/1306 |
| 2018/0039849 A1* | 2/2018 | You | G06V 40/70 |
| 2018/0075283 A1* | 3/2018 | You | G06V 40/1365 |
| 2019/0026525 A1* | 1/2019 | Long | H01L 23/10 |
| 2019/0302320 A1* | 10/2019 | Lee | G02B 5/005 |
| 2019/0363216 A1* | 11/2019 | Lin | G01S 17/04 |
| 2020/0235154 A1* | 7/2020 | Baek | G02B 5/208 |
| 2022/0057259 A1* | 2/2022 | Hsu | G01J 1/42 |

OTHER PUBLICATIONS

Search Report appended to an Office Action, which was issued to Taiwanese counterpart application No. 110130415 dated Dec. 6, 2022.

* cited by examiner

STRUCTURE OF OPTICAL SENSOR

FIELD OF THE INVENTION

This application refers to a structure of optical sensors, particularly an optical sensor with an adhesive film with the design of the optical structure.

BACKGROUND OF THE INVENTION

The optical sensor is a device that converts optical images into electronic signals, and is widely used in digital cameras and electron-optical devices; the optical sensor is mainly divided into the charge-coupled device (CCD) and complementary metal-oxide-semiconductor (CMOS) active pixel sensors; the optical sensor s are now widely used in various electronic devices.

The conventional optical sensors are limited by the manufacturing process and the relation between size and structure, making it unable to equip an optical lens in the sensor and thus the structures of conventional optical sensors are relatively single and have many limitations in product applications. In conventional technologies, it is necessary to design a variety of different sensors to meet the different application demanding of the market; besides, after a single optical sensor is packaged, it can only meet a single demand and leads to an increase in the manufacturing cost of the optical sensor. Therefore, the industry needs an optical sensor that can correspond to design change after being packaged.

According to the aforesaid problems in the conventional art, this application provides a structure of the optical sensor, in which a photosensitive element is arranged above the substrate and is covered with a colloid layer; a film member is arranged above the colloid layer; the film is bonded to the colloid layer by an adhesive layer; optical elements are arranged above the film member. The film member can be equipped on the colloid layer above the substrate after the optical sensor is packaged. Employing this structure, we can change the optical design of the optical sensor according to our actual requirements.

SUMMARY

The Objective according to this application is to provide a structure of optical sensor in which a photosensitive element is arranged above the substrate, and the photosensitive element is covered with a colloid layer. After the optical sensor is packaged, a film member is arranged above the colloid layer and equipped with the required optical elements on the film member per our requirements. The structure of the optical sensor can change the optical design according to the requirements of different applications.

To achieve the aforesaid purposes and effects, this application provides an optical sensor structure, which includes: an optical sensor structure that includes: a substrate, a photosensitive element, a colloid layer, and a film member. The photosensitive element is arranged above the substrate; the colloid layer is equipped above the substrate and covers the photosensitive element. The film member includes an adhesive layer and a light-transmitting layer, and the adhesive layer is arranged above the colloid layer; the light-transmitting layer is equipped above the adhesive layers. This structure is used to provide an optical sensor that can change the optical design according to the requirements.

To achieve the aforesaid purposes and effects, this application provides a structure of the optical sensor, which includes: an optical sensor structure that includes: a substrate, a photosensitive element, a colloid layer, a shielding layer, and a film member. The photosensitive element is equipped above the substrate; the colloid layer is arranged above the substrate and covers the photosensitive element. The shielding layer is equipped above the substrate and covers the colloid layer. The shielding layer has a hole-perforation in the location corresponding to the photosensitive element. The film member includes an adhesive layer and a light-transmitting layer; the adhesive layer is arranged above the shielding layers; the light-transmitting layer is arranged above the adhesive layer. This structure is used to provide an optical sensor that can change the optical design according to the requirements.

DETAILED DESCRIPTION

To enable the Review Committee members to have a deeper realization and understanding of the features and functions according to this application, we hereby put the embodiments and detailed explanation below:

According to the aforesaid problems in the conventional art, this application provides a structure of optical sensor in which a photosensitive element is equipped above a substrate; a colloid layer is equipped above the substrate and covers the photosensitive element. Equip a film member that contains an adhesive layer and a light-transmitting layer; the adhesive layer is equipped above colloid layers and the light-transmitting layer is equipped above the adhesive layer. This structure is used to provide an optical sensor that can change the optical design according to the requirements, which can solve the problem in the conventional art that the design can only correspond to a single demand and leads to an increase in the manufacturing cost of the optical sensor.

Figure 1:
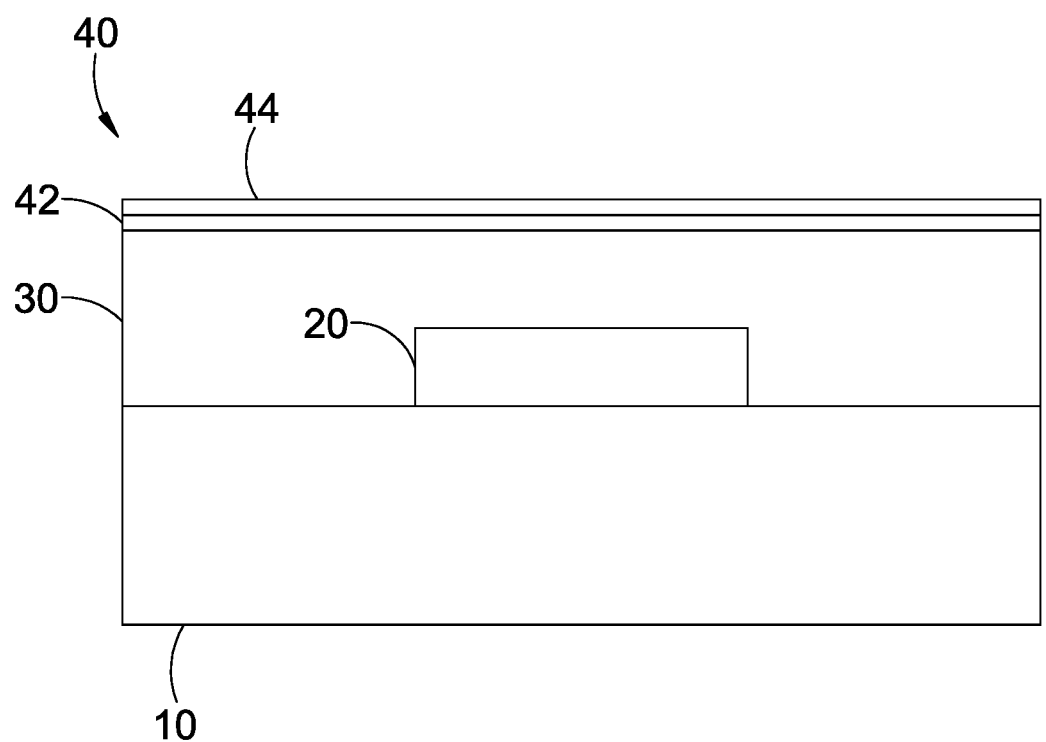
FIG. 1: which is a schematic diagram of a structure in the first embodiment according to this application.

Referring to FIG. 1, which is the schematic diagram of the structure in the first embodiment according to this application. As shown in FIG. 1, it is a structure 1 of optical sensor that contains a substrate 10, a photosensitive element 20, a colloid layer 30, and a film member 40. In this embodiment, film member 40 is installed after structure 1 of the optical sensor is packaged.

Again, referring to FIG. 1, in this embodiment, the photosensitive element 20 is equipped above the substrate 10; the photosensitive element 20 is used to receive a light L1 (not shown in FIG. 1); the colloid layer 30 is equipped above the substrate 10; the colloid layer 30 covers the photosensitive element 20. The film member 40 is equipped above the colloid layer 30; the film member 40 contains an adhesive layer 42 and a light-transmitting layer 44; the adhesive layer 42 is equipped above the colloid layer 30, the light-transmitting layer 44 is equipped above the adhesive layer 42.

In this embodiment, the light-transmitting layer 44 of the film member 40 can use a material with light polarization or material with photosensitive spectrum filtering. The light-transmitting layer 44 of this embodiment can protect the colloid layer 30 and prevent it from being worn by external forces. In the structure of this embodiment, after the optical sensor is packaged, the film member 40 can be changed according to requirements, and one or more films with optical characteristics can be attached to update the optical design of the optical sensor.

Figure 2:
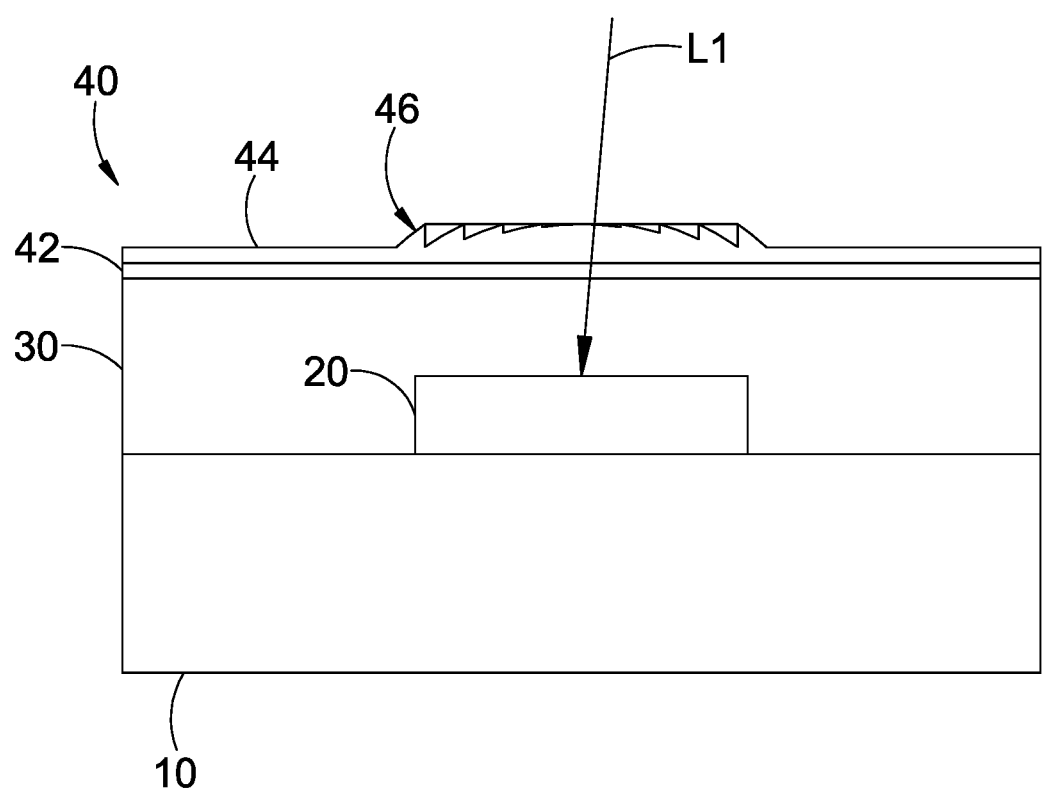
FIG. 2: which is a schematic diagram of a structure in the second embodiment according to this application.

Referring to FIG. 2, which is the schematic diagram of a structure in the second embodiment according to this application. As shown in FIG. 2, this embodiment is the second embodiment, which is based on the aforesaid first embodiment. It further equips a first protruding member 46 above the light-transmitting layer 44 of the film member 40; the first protruding member 46 is used to change the optical characteristics of the light L1 and is received by the photosensitive element 20 to generate signals. In the structure of this embodiment, after the optical sensor is packaged, the film member 40 can be changed according to requirements, and one or more films with optical characteristics can be attached to update the optical design of the optical sensor.

Figure 3:
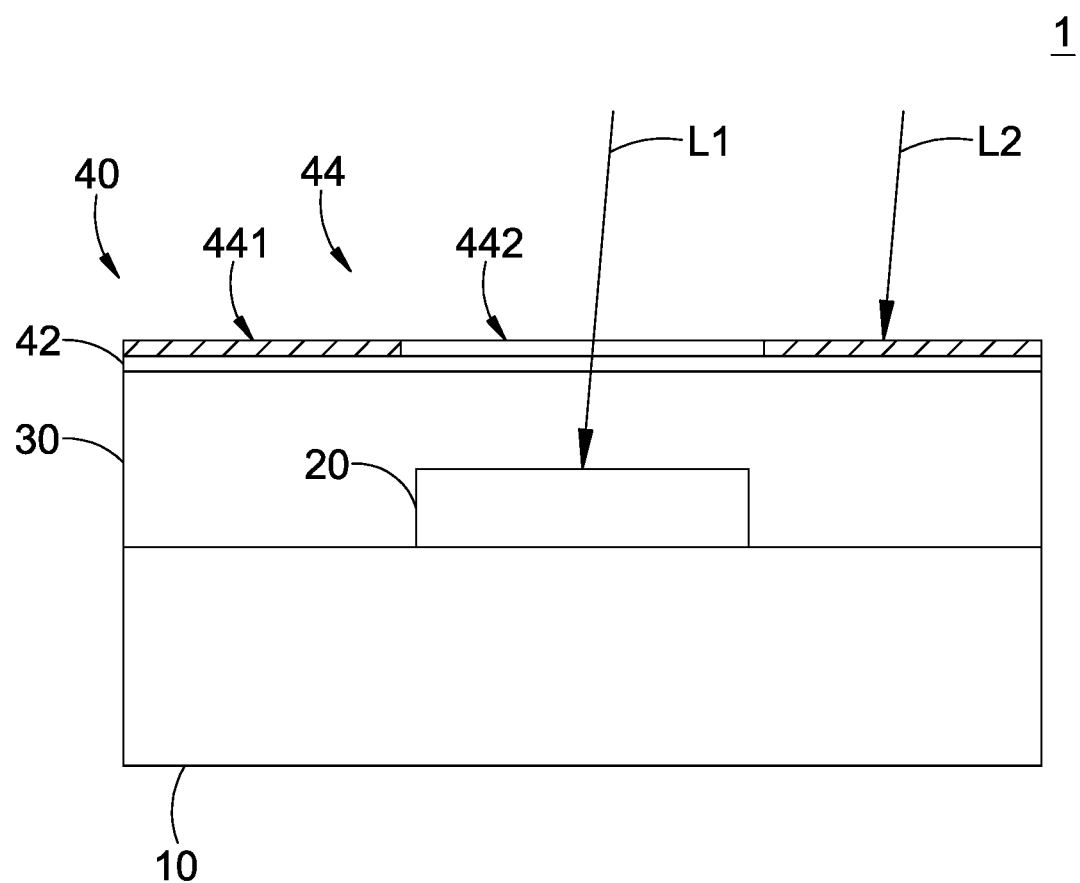
FIG. 3: which is a schematic diagram of a structure in the third embodiment according to this application.

Referring to FIG. 3, which is the schematic diagram of a structure in the third embodiment according to this application. As shown in FIG. 3, this embodiment is based on the aforesaid first embodiment. In this embodiment, the light-transmitting layer 44 of the film member 40 contains a light-transmitting zone 442 and a light-shielding zone 441. The light-shielding zone 441 is used to block out a light L2 that is not needed, and the location of the light-transmitting zone 442 corresponds to the location of the photosensitive element 20, making the photosensitive element 20 only receive the light L1 passing through the light-transmitting zone 442 and reduce other light interference, and thus improve the photosensitive efficiency of the photosensitive element 20. In the structure of this embodiment, after the optical sensor is packaged, the film member 40 can be changed according to requirements, and one or more films with optical characteristics can be attached to update the optical design of the optical sensor.

Figure 4:
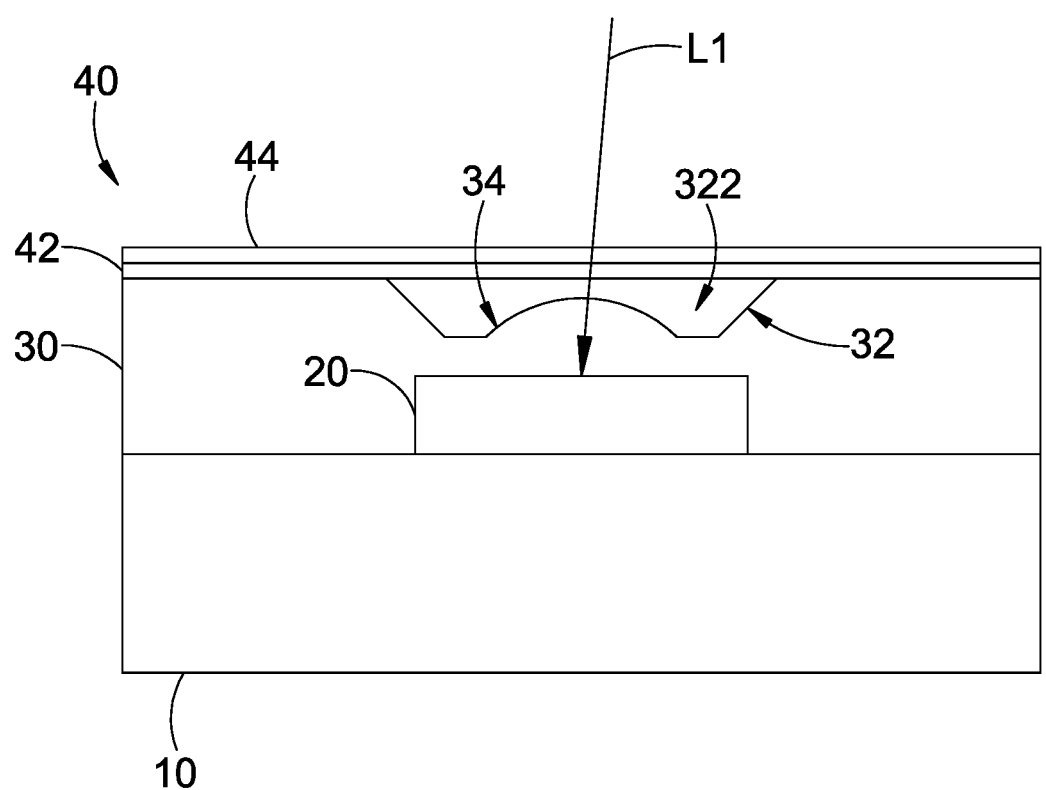
FIG. 4: which is a schematic diagram of a structure in the fourth embodiment according to this application.

Referring to FIG. 4, which is the schematic diagram of a structure in the fourth embodiment according to this application. As shown in FIG. 4, this embodiment is based on the aforesaid first embodiment. It further equips a cutting slot 32 above the colloid layer 30; the location of cutting slot 32 corresponds to the location of photosensitive element 20. The space between the cutting slot 32 and the adhesive layer 42 of the film member 40 forms an accommodating space 322. One inner side of the accommodating space 322 is equipped with a second protruding member 34; the second protruding member 34 is equipped above the colloid layer 30 and integrates with the colloid layer 30 into one piece. The second protruding member 34 is used to change the optical characteristics of the light L1 and received by the photosensitive element 20 to generate signals. In the structure of this embodiment, after the optical sensor is packaged, the film member 40 can be changed according to requirements, and one or more films with optical characteristics can be attached to update the optical design of the optical sensor.

Figure 5:
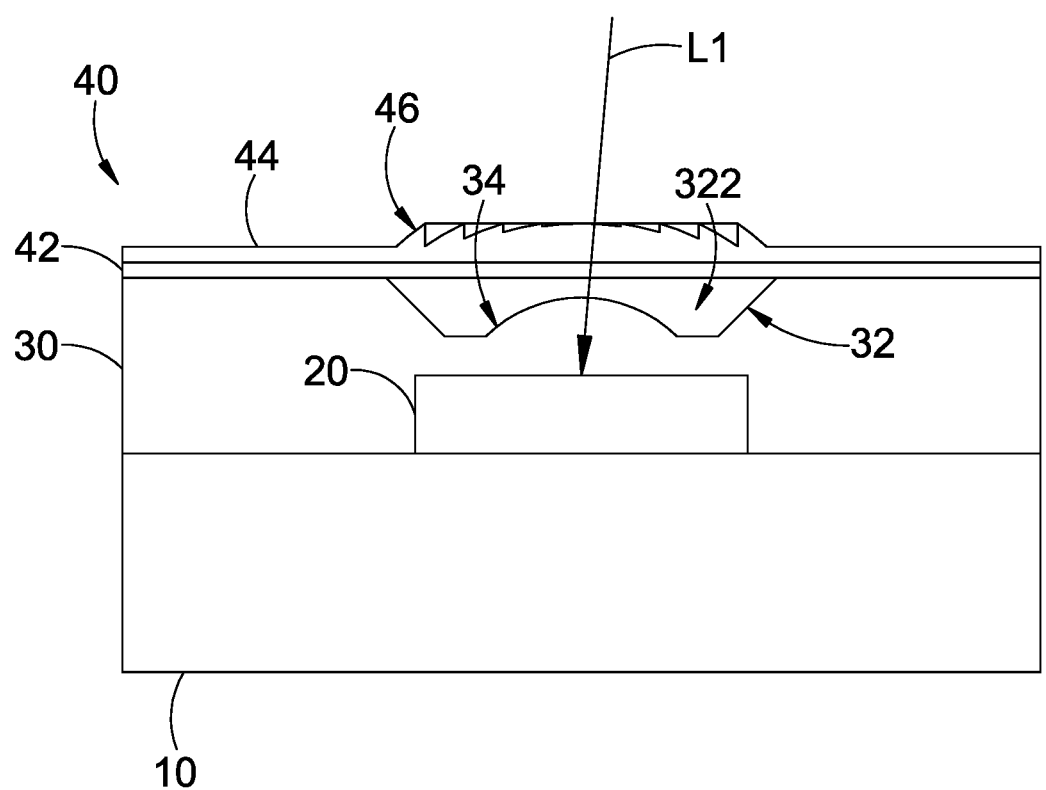
FIG. 5: which is a schematic diagram of a structure in the fifth embodiment according to this application.

Referring to FIG. 5, which is the schematic diagram of a structure in the fifth embodiment according to this application. As shown in FIG. 5, this embodiment is based on the aforesaid first to fourth embodiments. It further equips the first protruding member 46 above the light-transmitting layer 44 of the film member 40, and the cutting slot 32 above the colloid layer 30. The second protruding member 34 is equipped at the inner side of the accommodating space 322 in the cutting slot 32. The location of the first protruding member 46 corresponds to the location of the second protruding member 34. The first protruding member 46 and the second protruding member 34 are used to changing the optical characteristics of the light L1 and are received by the photosensitive element 20 to generate signals. In this embodiment, the light-transmitting layer 44 of the film member 40 also can include the light-transmitting zone 442 and the light-shielding zone 441 to further improve the photosensitive efficiency. In the structure of this embodiment, after the optical sensor is packaged, the film member 40 can be changed according to requirements, and one or more films with optical characteristics can be attached to update the optical design of the optical sensor.

Figure 6:
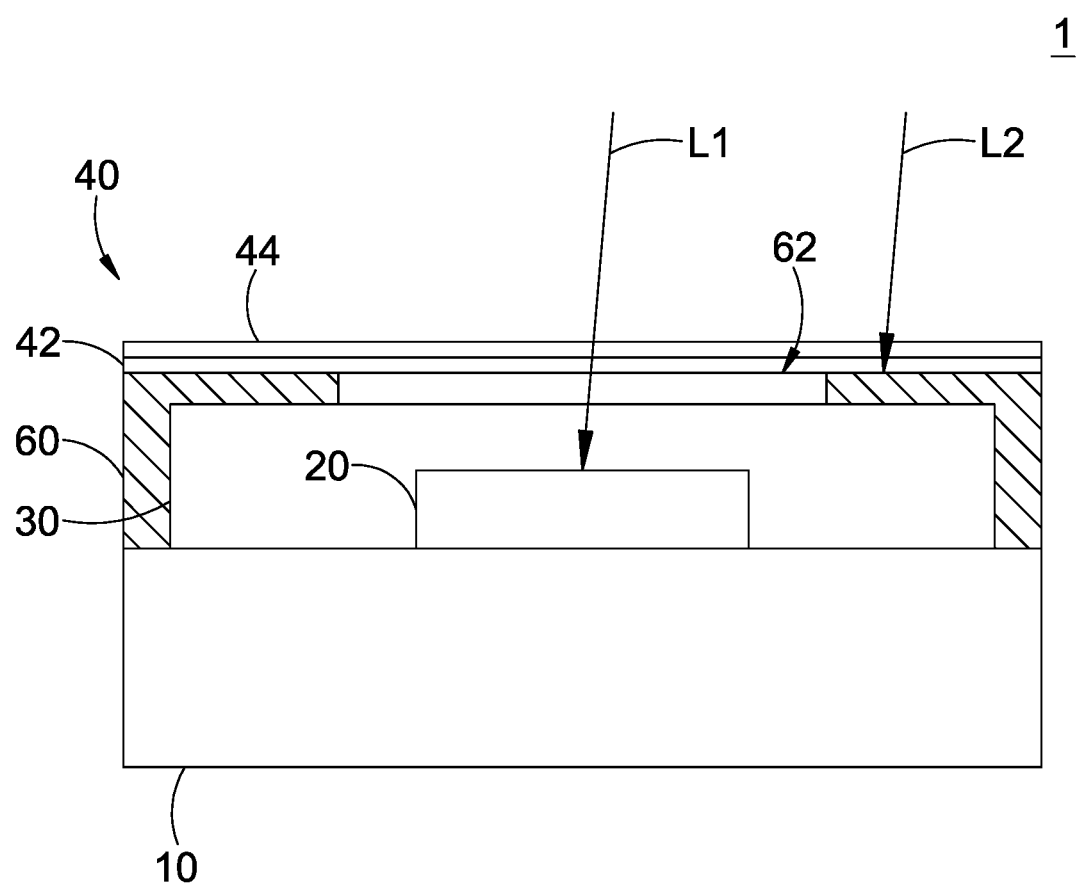
FIG. 6: which is a schematic diagram of a structure in the sixth embodiment according to this application.

Referring to FIG. 6, which is the schematic diagram of a structure in the sixth embodiment according to this application. As shown in FIG. 6, this embodiment is structure 1 of an optical sensor, which contains a substrate 10, a photosensitive element 20, a colloid layer 30, a shielding layer 60, and a film member 40. In this embodiment, the film member 40 is installed after the structure 1 of the optical sensor is packaged. In the structure of this embodiment, after the optical sensor is packaged, the film member 40 can be changed according to requirements, and one or more films with optical characteristics can be attached to update the optical design of the optical sensor.

Again, referring to FIG. 6, in this embodiment, the photosensitive element 20 is equipped above the substrate 10 to receive the light L1. The colloid layer 30 is equipped above the substrate 10 and covers the photosensitive element 20. The shielding layer 60 is equipped above the substrate 10 and covers the colloid layer 30. The shielding layer 60 has a hole-perforation 62 in the location corresponding to the photosensitive element 20. The film member 40 is equipped above the shielding layer 60; the film member 40 contains an adhesive layer 42 and a light-transmitting layer 44; the adhesive layer 42 is equipped above the shielding layer 60, the light-transmitting layer 44 is equipped above the adhesive layer 42. In this embodiment, the shielding layer 60 is an opaque element, and the hole-perforation 62 is used to allow a light L1 to pass through it and block out the unnecessary light L2 from passing through, which thus can improve the photosensitive efficiency of the photosensitive element 20. In the structure of this embodiment, after the optical sensor is packaged, the film member 40 can be changed according to requirements, and one or more films with optical characteristics can be attached to update the optical design of the optical sensor.

Figure 7:
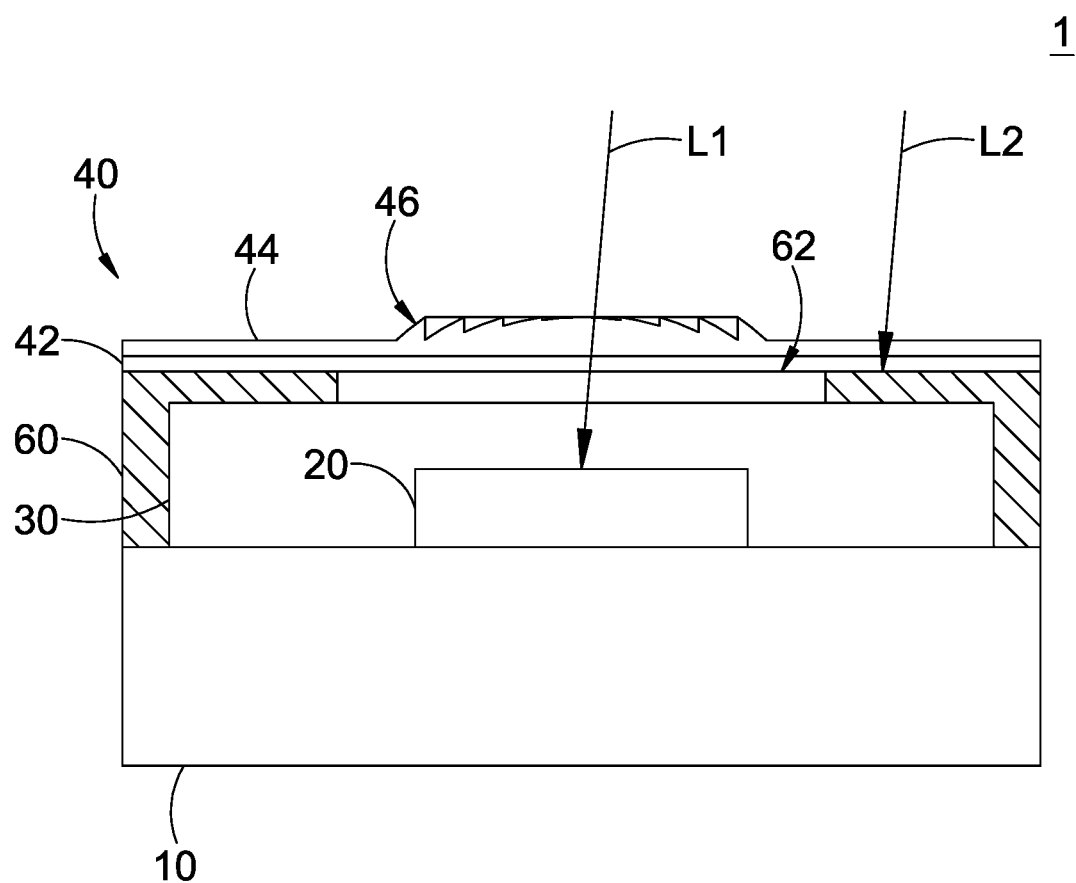
FIG. 7: which is a schematic diagram of a structure in the seventh embodiment according to this application.

Referring to FIG. 7, which is the schematic diagram of a structure in the seventh embodiment according to this application. As shown in FIG. 7, this embodiment is based on the aforesaid sixth embodiment. In this embodiment, it further equips a first protruding member 46 above the light-transmitting layer 44 of the film member 40. The first protruding member 46 is used to change the optical characteristics of the light L1 and is received by the photosensitive element 20 to generate signals. In the structure of this embodiment, after the optical sensor is packaged, the film member 40 can be changed according to requirements, and one or more films with optical characteristics can be attached to update the optical design of the optical sensor.

Figure 8:
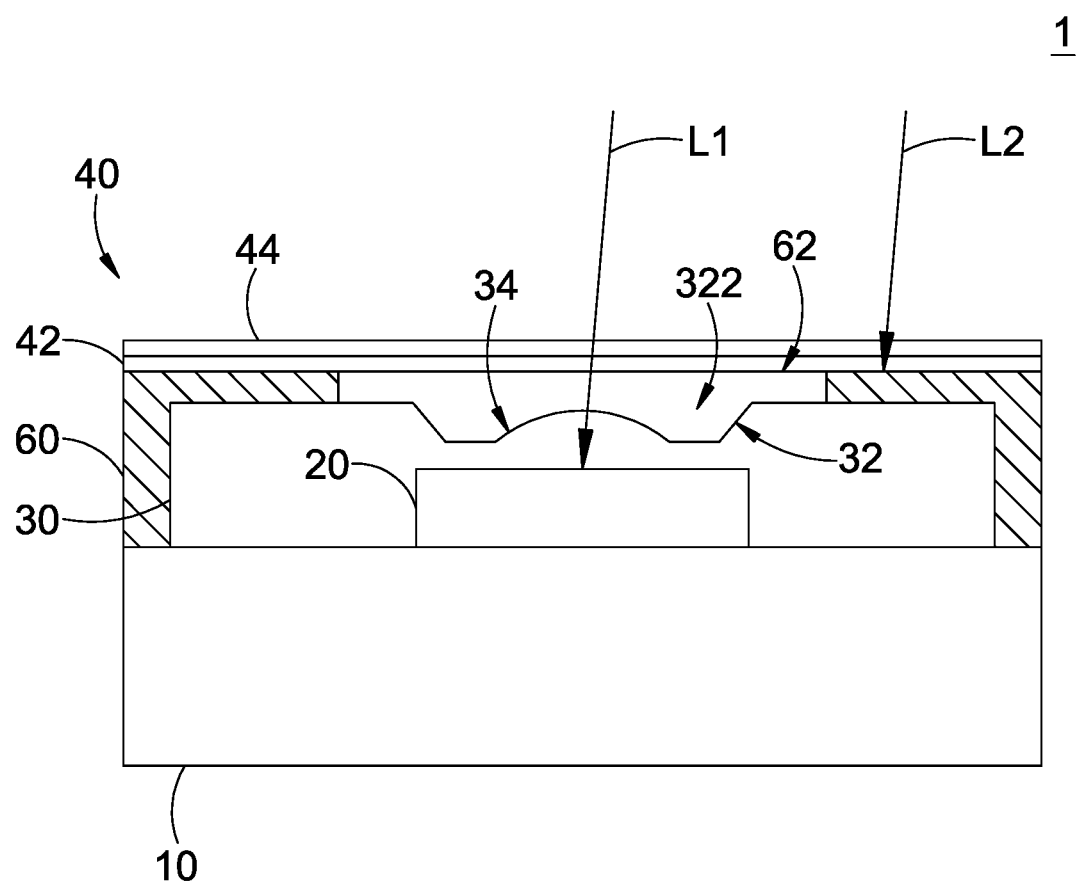
FIG. 8: which is a schematic diagram of a structure in the eighth embodiment according to this application.

Referring to FIG. 8, which is the schematic diagram of a structure in the eighth embodiment according to this application. As shown in FIG. 8, this embodiment is based on the aforesaid sixth embodiment. This embodiment further equips a cutting slot 32 above the colloid layer 30; the location of the cutting slot 32 corresponds to the location of the photosensitive element 20. The space between the cutting slot 32 and the hole-perforation 62 of the shielding layer 60 forms an accommodating space 322. One inner side of the accommodating space 322 is equipped with a second protruding member 34; the second protruding member 34 is equipped above the colloid layer 30 and integrates with the colloid layer 30 into one piece. The second protruding member 34 is used to change the optical characteristics of the light L1 and is received by the photosensitive element 20 to generate signals. In this embodiment, the inner side of the accommodating space 322 is filled with air or inert gas or is vacuumed by air extraction, which is not limited in this embodiment. In the structure of this embodiment, after the optical sensor is packaged, the film member 40 can be changed according to requirements, and one or more films with optical characteristics can be attached to update the optical design of the optical sensor.

Figure 9:
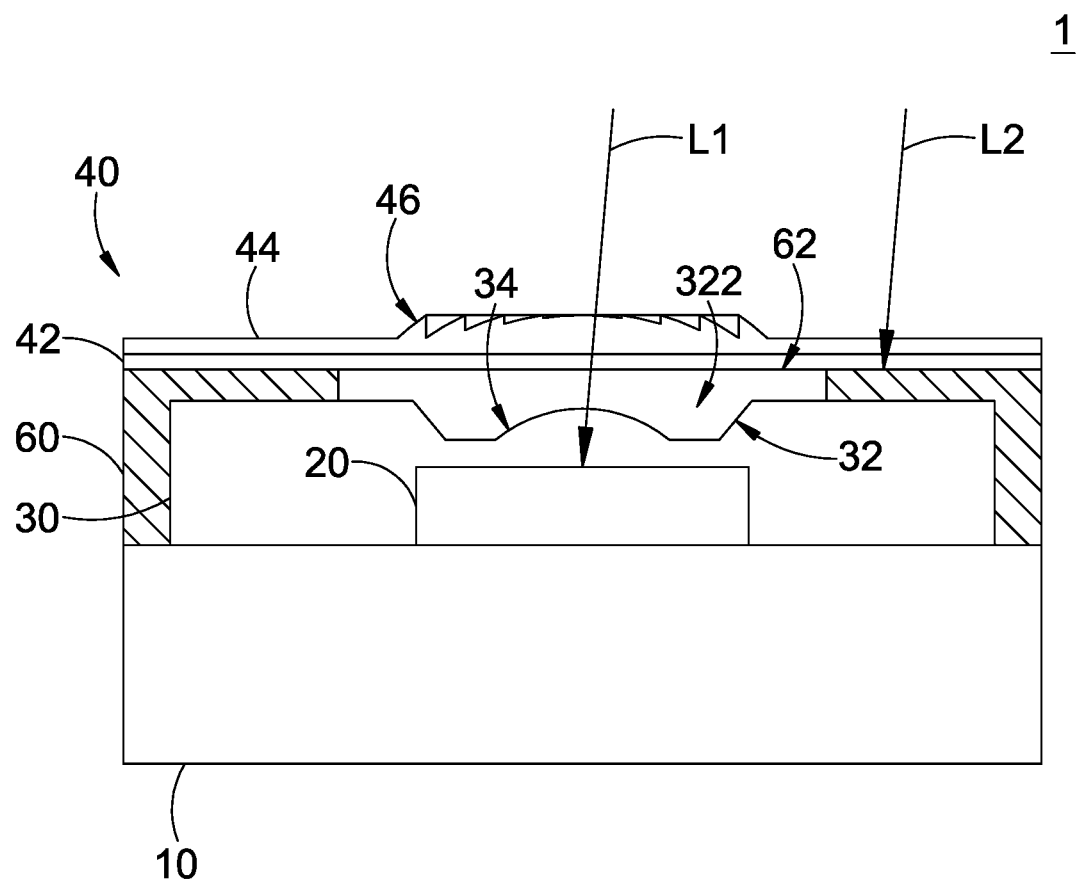
FIG. 9: The schematic diagram of a structure in the ninth embodiment according to this application.

Referring to FIG. 9, which is the schematic diagram of a structure in the ninth embodiment according to this application. As shown in FIG. 9, this embodiment is based on the aforesaid sixth to eighth embodiments. It further equips the first protruding member 46 above the light-transmitting layer 44 of the film member 40, and the cutting slot 32 above the colloid layer 30. The second protruding member 34 is equipped at the inner side of the accommodating space 322 in the cutting slot 32. The location of the first protruding member 46 corresponds to the location of the second protruding member 34. The first protruding member 46 and the second protruding member 34 are used to changing the optical characteristics of the light L1 and are received by the photosensitive element 20 to generate signals. In the structure of this embodiment, after the optical sensor is packaged, the film member 40 can be changed according to requirements, and one or more films with optical characteristics can be attached to update the optical design of the optical sensor.

In summary, this application provides a structure of the optical sensor, which is attached to the surface of the optical sensor and then laminated with one or more films with optical characteristics, making the optical sensor, which originally can only be used in a single application, can laminate different films corresponding to different applications. If the optical sensors have extra inventory, they can be laminated with the processed films to change the applications and reuse them to reduce the condition of a large amount of sluggish inventory; and it can reduce the R&D time of photosensitive products and facilitate the cost control issue. This application can solve the problem that conventional art can merely meet a single demand; once the demand changes, it will lead to an increase of manufacturing cost on the optical sensors.

The invention claimed is:

1. A structure of an optical sensor, which includes:
   a substrate;
   a photosensitive element, equipped above the substrate;
   a colloid layer equipped above the substrate and covers the photosensitive element; and
   a film member, including an adhesive layer and a light-transmitting layer, wherein the adhesive layer is equipped above the colloid layer, the light-transmitting layer is equipped above the adhesive layer;
   wherein the film member and the colloid layer allows the photosensitive element receive light.

2. The structure of the optical sensor of claim 1, in which a first protruding member is protruded above the light-transmitting layer.

3. The structure of the optical sensor of claim 1, in which the light-transmitting layer contains a light-transmitting zone and a light-shielding zone; the light-transmitting zone corresponds to the photosensitive element.

4. The structure of optical sensor of claim 1, in which a cutting slot is equipped above the colloid layer; the location of the cutting slot corresponds to the location of the photosensitive element; a space between the cutting slot and the adhesive layer forms an accommodating space.

5. The structure of the optical sensor of claim 4, in which a protruding member is equipped at an inner side of the accommodating space and protruded toward the colloid layer.

6. A structure of an optical sensor, which includes:
   a substrate;
   a photosensitive element, equipped above the substrate;
   a colloid layer that is equipped above the substrate that overs the photosensitive element;
   a shielding layer that is equipped above the substrate that covers the colloid layer; the shielding layer has a hole-perforation in the location of the shielding layer corresponding to the location of the photosensitive element; and
   a film member that contains an adhesive layer and a light-transmitting layer, the adhesive layer is equipped above the shielding layer, wherein the light-transmitting layer is equipped above the adhesive layer;
   wherein the film member, the hole-perforation and the colloid layer allows the photosensitive element receive light, and the shielding layer blocking the light.

7. The structure of the optical sensor of claim 6, in which a first protruding member is protruded above the light-transmitting layer.

8. The structure of the optical sensor of claim 6, in which a cutting slot is equipped above the colloid layer; the location of the cutting slot corresponds to the location of the photosensitive element; a space between the cutting slot and the hole-perforation forms an accommodating space.

9. The structure of the optical sensor of claim 8, in which a protruding member is equipped at an inner side of the accommodating space and protruded toward the colloid layer.

* * * * *